(12) United States Patent
Miller, Jr. et al.

(10) Patent No.: US 11,726,904 B2
(45) Date of Patent: Aug. 15, 2023

(54) CONTROLLED INPUT/OUTPUT IN PROGRESS STATE DURING TESTCASE PROCESSING

(71) Applicant: INTERNATIONAL BUSINESS MACHINES CORPORATION, Armonk, NY (US)

(72) Inventors: Robert Miller, Jr., Poughkeepsie, NY (US); Harris M. Morgenstern, Wappingers Falls, NY (US); Charles Eugene Mari, Wappingers Falls, NY (US); Christopher Lee Wood, Hyde Park, NY (US); Alfred Francis Foster, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 17/482,769

(22) Filed: Sep. 23, 2021

(65) Prior Publication Data
US 2023/0086432 A1 Mar. 23, 2023

(51) Int. Cl.
G06F 11/36 (2006.01)
G06F 3/06 (2006.01)

(52) U.S. Cl.
CPC ........ *G06F 11/3688* (2013.01); *G06F 3/0604* (2013.01); *G06F 3/065* (2013.01);
(Continued)

(58) Field of Classification Search
CPC .... G06F 11/36; G06F 11/3688; G06F 3/0604; G06F 3/0664; G06F 11/3684
See application file for complete search history.

(56) References Cited

U.S. PATENT DOCUMENTS 4,730,318 A 3/1988 Bogholtz, Jr. et al.
7,266,738 B2 9/2007 Sato
(Continued)

FOREIGN PATENT DOCUMENTS

CN 105550111 A 5/2016
CN 107193699 A 9/2017
CN 107506292 B 4/2021

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Kamini B Patel
(74) *Attorney, Agent, or Firm* — Teddi Maranzano, Esq.; Kevin P. Radigan, Esq.; Heslin Rothenberg Farley & Mesiti P.C.

(57) ABSTRACT

A transient input/output in progress state is established during processing of an input/output testcase by a test infrastructure in a computing environment. The method includes obtaining the input/output testcase for an object having one or more pages, and processing the input/output testcase by the test infrastructure. Processing the input/output testcase by the test infrastructure includes, for a page of the object, generating a delay in the processing of the input/output testcase for the page of the object. The delay opens a transient input/output in progress state during which one or more concurrent test operations are to reference the page of the object.

20 Claims, 13 Drawing Sheets

(52) U.S. Cl.
CPC .......... *G06F 3/0664* (2013.01); *G06F 3/0683* (2013.01); *G06F 11/3684* (2013.01)

(56) References Cited

U.S. PATENT DOCUMENTS

| | | | |
|---|---|---|---|
| 7,477,684 B2 | 1/2009 | Watanabe | |
| 7,512,933 B1* | 3/2009 | Tortosa | G06F 11/3672 |
| | | | 717/124 |
| 7,782,064 B2 | 8/2010 | Matsumoto et al. | |
| 8,813,035 B2* | 8/2014 | Mathew | G06F 11/3684 |
| | | | 717/124 |
| 9,542,301 B1 | 1/2017 | Griesemer et al. | |
| 10,387,295 B1* | 8/2019 | Kesarwani | G06F 11/3664 |
| 2008/0271042 A1* | 10/2008 | Musuvathi | G06F 11/3688 |
| | | | 718/108 |
| 2011/0271284 A1* | 11/2011 | Simonian | G06F 11/3664 |
| | | | 718/102 |
| 2012/0089873 A1* | 4/2012 | Wang | G06F 11/3688 |
| | | | 714/33 |
| 2013/0036404 A1* | 2/2013 | Shu | G06F 11/3676 |
| | | | 717/127 |
| 2013/0227528 A1* | 8/2013 | Mathew | G06F 11/3684 |
| | | | 717/124 |
| 2018/0285249 A1* | 10/2018 | Hanumanthappa | ............ |
| | | | G06F 11/3688 |
| 2019/0043278 A1 | 2/2019 | Frederic et al. | |
| 2022/0188086 A1* | 6/2022 | Yamato | G06F 8/4452 |

OTHER PUBLICATIONS

IBM Publication, "z/Architecture Principles of Operation," IBM® Publication No. SA22-7832-12, 13th Edition, Sep. 2019 (pp. 1-2000).

\* cited by examiner

OBTAIN AN INPUT/OUTPUT TESTCASE FOR AN OBJECT HAVING ONE OR MORE PAGES ~500

PROCESS THE INPUT/OUTPUT TESTCASE BY A TEST INFRASTRUCTURE, THE PROCESSING INCLUDING, FOR A PAGE OF THE OBJECT: ~502

GENERATING A DELAY IN THE PROCESSING OF THE INPUT/OUTPUT TESTCASE FOR THE PAGE OF THE OBJECT, THE DELAY OPENING A TRANSIENT INPUT/OUTPUT IN PROGRESS STATE DURING WHICH ONE OR MORE CONCURRENT TEST OPERATIONS ARE TO REFERENCE THE PAGE OF THE OBJECT ~504

FURTHER INCLUDING PERFORMING THE ONE OR MORE CONCURRENT TEST OPERATIONS DURING PROCESSING OF THE INPUT/OUTPUT TESTCASE, WHERE A CONCURRENT TEST OPERATION OF THE ONE OR MORE CONCURRENT TEST OPERATIONS IS CREATED BY THE INPUT/OUTPUT TESTCASE ~506

FURTHER INCLUDING TESTING A SYSTEM, THE TESTING INCLUDING THE OBTAINING AND THE PROCESSING, AND WHERE THE METHOD FURTHER INCLUDES: ~508

DETECTING AN ERROR IN THE SYSTEM RESULTING FROM PERFORMING THE ONE OR MORE CONCURRENT TEST OPERATIONS ~510

PERFORMING AN ACTION BASED ON DETECTING THE ERROR TO FACILITATE CORRECTING THE SYSTEM ~512

WHERE THE OBTAINED INPUT/OUTPUT TESTCASE SPECIFIES A BREAKPOINT ROUTINE, AND GENERATING THE DELAY IS BASED ON THE BREAKPOINT ROUTINE ~514

FIG. 5A

WHERE THE INPUT/OUTPUT TESTCASE INCLUDES A PAGE MAP CONTROL STRUCTURE FOR THE OBJECT, THE PAGE MAP CONTROL STRUCTURE SPECIFYING A DELAY PARAMETER, AND GENERATING THE DELAY IS BASED ON THE DELAY PARAMETER OF THE PAGE MAP CONTROL STRUCTURE — 516

WHERE THE INPUT/OUTPUT TESTCASE INCLUDES AN INPUT/OUTPUT OPERATION, THE TEST INFRASTRUCTURE PERFORMING THE INPUT/OUTPUT OPERATION IS A VIRTUAL MEMORY TO VIRTUAL MEMORY COPY OPERATION, THE DELAY OPENS THE TRANSIENT INPUT/OUTPUT IN PROGRESS STATE DURING THE VIRTUAL MEMORY TO VIRTUAL MEMORY COPY OPERATION — 518

FURTHER INCLUDING ASSIGNING THE OBJECT TO AN OBJECT AREA OF VIRTUAL MEMORY MANAGED BY THE TEST INFRASTRUCTURE — 520

WHERE THE INPUT/OUTPUT TESTCASE FURTHER ESTABLISHES A RELATIONSHIP BETWEEN A WINDOW OF TESTCASE VIRTUAL MEMORY AND THE OBJECT — 522

WHERE PROCESSING THE INPUT/OUTPUT TESTCASE BY THE TEST INFRASTRUCTURE INCLUDES PERFORMING A MEMORY-TO-MEMORY COPY BY THE TEST INFRASTRUCTURE IN PLACE OF AN INPUT/OUTPUT OPERATION TO AN OBJECT STORAGE DEVICE, THE MEMORY-TO-MEMORY COPY BEING BETWEEN THE WINDOW OF TESTCASE VIRTUAL MEMORY AND THE OBJECT AREA OF THE VIRTUAL MEMORY MANAGED BY THE TEST INFRASTRUCTURE — 524

WHERE GENERATING THE DELAY INCLUDES REMAINING IN THE TRANSIENT INPUT/OUTPUT IN PROGRESS STATE UNTIL A PREDEFINED EVENT HAS OCCURRED — 526

WHERE THE INPUT/OUTPUT TESTCASE IS AN OUTPUT TESTCASE, AND THE TEST INFRASTRUCTURE INCLUDES AN OUTPUT TEST INFRASTRUCTURE, AND THE GENERATED DELAY IS BASED ON A BREAKPOINT INTERCEPT ROUTINE SPECIFIED BY THE INPUT/OUTPUT TESTCASE OR A DELAY SPECIFIED IN A PAGE MAP CONTROL STRUCTURE BY THE INPUT/OUTPUT TESTCASE — 528

WHEREIN THE INPUT/OUTPUT TESTCASE IS AN INPUT TESTCASE, AND THE TEST INFRASTRUCTURE COMPRISES AN INPUT TEST INFRASTRUCTURE, AND WHEREIN THE GENERATED DELAY IS BASED ON A BREAKPOINT EXIT ROUTINE SPECIFIED BY THE INPUT/OUTPUT TESTCASE OR A DELAY SPECIFIED IN A PAGE MAP CONTROL STRUCTURE BY THE INPUT/OUTPUT TESTCASE — 530

FIG. 5B

CONTROLLED INPUT/OUTPUT IN PROGRESS STATE DURING TESTCASE PROCESSING

BACKGROUND

One or more aspects relate, in general, to facilitating processing within a computing environment, and in particular, to improving test processing of a computing environment.

A primary purpose of system or software testing is to detect failure so that defects can be discovered and corrected. The testing of a system can involve the execution of the code in various environments and conditions in determining whether the system functions properly in the various environments and conditions.

A test system or tool can be separate from a system being tested and/or integrated into the system being tested. Broadly, there are multiple levels of testing, including unit testing, integration testing and system testing, as well as acceptance testing. Further advancements in testing one or more levels are desirous in order to facilitate processing within a computing environment by, for instance, improving testing results for the computing environment.

SUMMARY

Certain shortcomings of the prior art are overcome and additional advantages are provided through the provision, in one or more aspects, of a computer program product for facilitating processing within a computing environment. The computer program product includes at least one computer-readable storage medium having program instructions embodied therewith. The program instructions are readable by a processing circuit to cause the processing circuit to perform a method including obtaining an input/output testcase for an object having one or more pages and processing the input/output testcase by a test infrastructure. The processing includes, for a page of the object, generating a delay in the processing of the input/output testcase for the page of the object. The delay opens a transient input/output in progress state during which one or more concurrent test operations are to reference the page of the object.

Computer systems and computer-implemented methods relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A-5B depict a further embodiment of a workflow illustrating certain aspects of one or more embodiments of the present invention;

DETAILED DESCRIPTION

Figure 1:
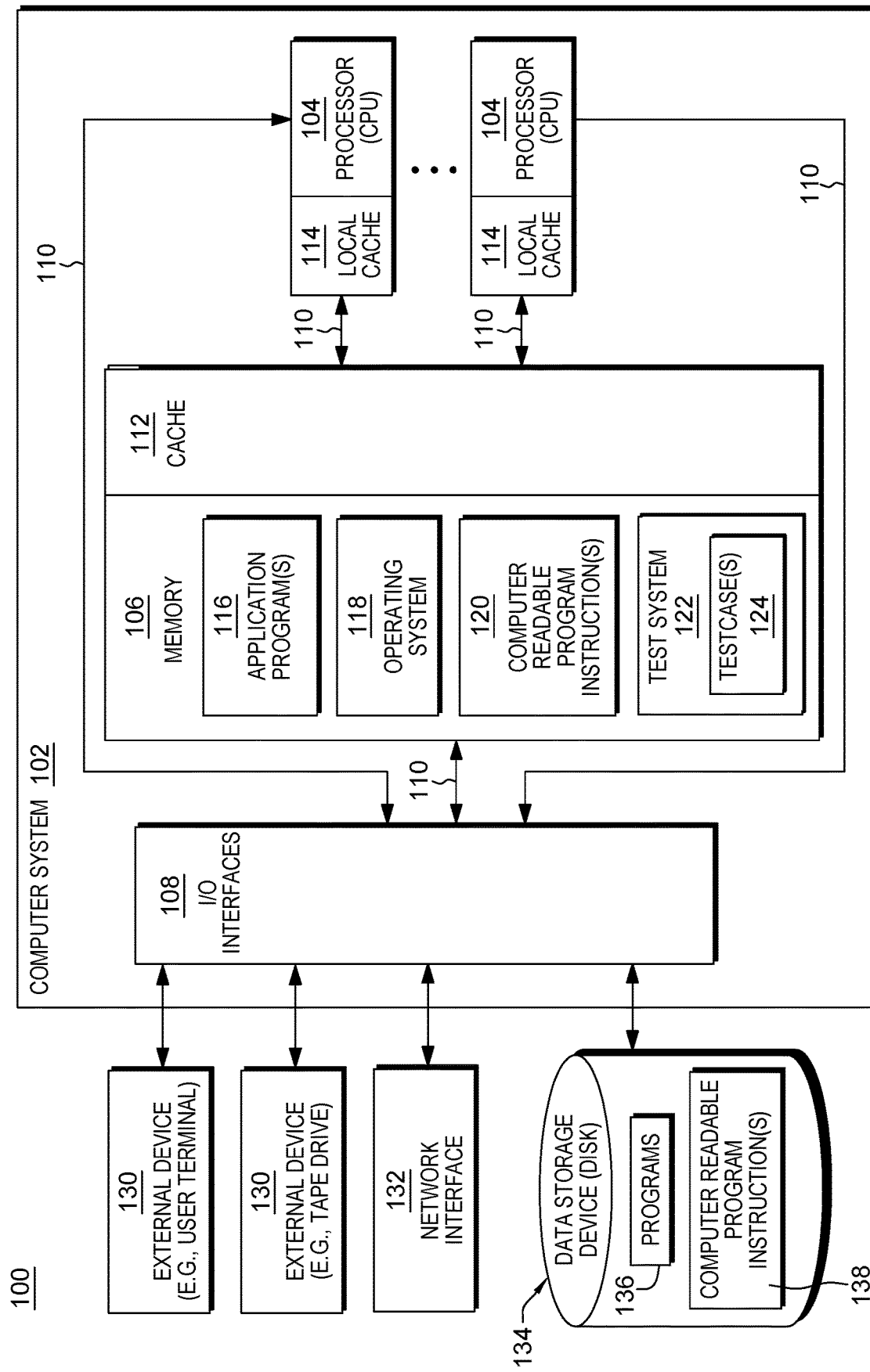
FIG. 1 depicts one example of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with this detailed description of the invention, serve to explain aspects of the present invention. Note in this regard that descriptions of well-known systems, devices, processing techniques, etc., are omitted so as not to unnecessarily obscure the invention in detail. It should be understood, however, that the detailed description and the specific example(s), while indicating aspects of the invention, are given by way of illustration only, and not limitation. Various substitutions, modifications, additions, and/or other arrangements, within the spirit or scope of the underlying inventive concepts, will be apparent to those skilled in the art from this disclosure. Note further that, numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in software, hardware or a combination thereof.

As understood by one skilled in the art, program code, as referred to in this application, can include software and/or hardware. For example, program code in certain embodiments of the present invention can include a software-based implementation of the functionality described, but other embodiments can utilize fixed function hardware. Certain embodiments combine both types of program code. An example of program code, also referred to as one or more programs or program instructions, is depicted in FIG. 1 as computer-readable program instructions 120. Other examples include application programs 116, operating system 118, and test system 122, one or more of which can be stored in memory 106 of computer system 102. Further examples include programs 136 and computer-readable program instruction(s) 138 in data storage device 134 of FIG. 1.

Most operating systems include some functionality that maps a range of memory, often referred to as a window of memory, to a file. For instance, the Portable Operating System Interface (POSIX) standard requires a Memory Mapped (MMAP) system call which performs such an operation. The underlying management of such an application program interface (API) requires a set of services that manage both the memory and the input/output (I/O) to the target file of an associated file system. These services can include the following: an associate service which sets up a relationship between a memory buffer and the file; a commit service which writes out the data in the mapped memory to the file system; a reset service which resets the data in the window memory to that of the file; and a disassociate service which terminates the relationship between the memory buffer and the file. In this process, there are two facilities that need to be managed, that is, the window mapping of the memory, and the file, also referred to as the object.

In the course of development, it would be useful to be able to test the window management function independent of the file management function. Doing so would allow testing to proceed independent of the services that manage the file system, which may not be available at the time. For instance, in one or more embodiments, the file system management services may be developed by an independent development team and not be available at the time of test. Further, control over the duration of specific input/output requests would be a very useful testing feature, but may not be possible through the associated file system. If such control is possible, then it normally means delaying all input/outputs for the entire device that the file (object) resides on. This could negatively impact other concurrent work using the associated storage device or file system.

Aspects of one or more embodiments of the present invention address these shortcomings by providing processes or services that are independent of the actual storage device, or file system, used to contain an object. In this manner, the exploiting applications that are to provide input and output routines to perform the actual input/output (I/O) for the object in operation are not necessary in order to test, for instance, a virtual data access service, for a memory map service.

In accordance with one or more aspects, the object is proposed to reside not on the external device, such as a file system, but rather in virtual memory, such as virtual memory obtained by test infrastructure. The test infrastructure (i.e., the application) provides input and output routines which handle the I/O operation, which in one or more embodiments, is a memory-to-memory copy operation, such as described herein. Interfaces are provided so that a testcase can specify the duration of the I/O to open a transient state (i.e., I/O in progress state) within which other concurrent operations or events that may impact the page of an object at issue are simpler to make happen. For instance, the concurrent operations or events could include an attempted reset of a page while the page is undergoing a commit process. Another example would be an attempted page fix of a page where input/output of the page is in progress. Various other concurrent operations or events could also be performed during an input/output in progress state, as described herein.

Advantageously, disclosed herein is the use of testing infrastructure for testing associated virtual memory built into or associated with a system under test, such as an operating system. Aspects disclosed allow testing concurrent processing during an input/output in progress state by introducing a delay in the input/output operation controlled by the testcase control program. In one embodiment, the testcase has control over the delay for a page of an object in order to provide deterministic testing. Advantageously, the processes disclosed herein eliminate, in one or more embodiments, the complexities of setting up and performing physical input/output in order to drive an input/output function under test.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, N.Y. One embodiment of the z/Architecture instruction set architecture is described in a publication entitled, "z/Architecture Principles of Operation", IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities can include and/or use one or more aspects of the present invention. z/Architecture and IBM are trademarks or registered trademarks of International Business Machines Corporation in at least one jurisdiction.

Referring to FIG. 1, a computing environment 100 includes, for instance, a computer system 102 shown, e.g., in the form of a general-purpose computing device. Computer system 102 can include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Memory 106 can include, for instance, a cache 112, such as a shared cache, which can be coupled to local caches 114 of processors 104. Further, memory 106 can include one or more programs or applications 116 and at least one operating system 118. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities can also be used. Memory 106 can also include one or more computer readable program instructions 120, and a test system 122, one or both of which can be configured to carry out functions of embodiments of aspects of the invention. In one embodiment, test system 120 can have one or more testcases 124 associated therewith.

Computer system 102 can communicate via, e.g., I/O interfaces 108 (e.g., peripheral component interconnect (PCI), and/or other I/O interface connections) with one or more external devices 130, such as a user terminal, a tape drive, a pointing device, a display, and one or more data storage devices 134, etc. A data storage device 134 can store one or more programs 136, one or more computer readable program instructions 138, and/or data, etc. The computer readable program instructions can be configured to carry out functions of embodiments of aspects of the invention.

Computer system 102 can also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components can be used in conjunction with computer system 102. Examples, include, but are not limited to: microcode, device drivers, redundant processing units, external disk drive arrays, RAID systems, tape drives, and data archival storage systems, etc.

Computer system 102 can be operational with numerous other general-purpose or special-purpose computing system environments or configurations. Examples of well-known computing systems, environments, and/or configurations that can be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor (e.g., processor 104) includes a plurality of functional components used to execute instructions. These functional components include, for instance, an instruction fetch component to fetch instructions to be executed; an instruction decode unit to decode the fetched instructions and to obtain operands of the decoded instructions; one or more instruction execute components to execute the decoded instructions; a memory access component to access memory for instruction execution, if necessary; and a write back component to provide the results of the executed instructions. One or more of the components can access and/or use one or more registers in instruction processing. Further, one or more of the components may, in accordance with one or more aspects of the present invention, include at least a portion of or have access to one or more other components used in performing system testing, as described herein. The one or more other components can include, for instance, a test component (or one or more other components).

In one or more embodiments, a computing environment such as depicted in FIG. 1 can support architectural functions, such as dynamic address translation (DAT). With appropriate support by an operating system, a dynamic address translation facility can be used to provide a system in which storage appears to be larger than the main storage (a.k.a., main memory) which is available in the configuration. This apparent main storage is referred to as virtual memory, and the addresses used to designate locations in the virtual memory are referred to as virtual addresses. The virtual memory of a system can far exceed the size of the main storage which is available in the configuration and normally is maintained in auxiliary storage (e.g., storage not directly addressable). The virtual memory is considered to be composed of blocks of addresses, called pages. Only the most recently referred to pages of the virtual memory are assigned to occupy blocks of physical main storage (e.g., random access memory (RAM)). As pages of virtual memory that do not appear in main storage are referred to, they are brought in to replace pages in main storage that are less likely to be needed. The swapping of pages of storage can be performed by the operating system.

A sequence of virtual addresses associated with virtual memory is an address space, and is referred to herein as a window of virtual memory and/or an area of virtual memory. The dynamic address translation facility can be used to provide a number of address spaces. These address spaces can be used to provide degrees of isolation between applications. Such support can include a completely different address space for, for instance, one or more testcases and the test infrastructure.

Figure 2:
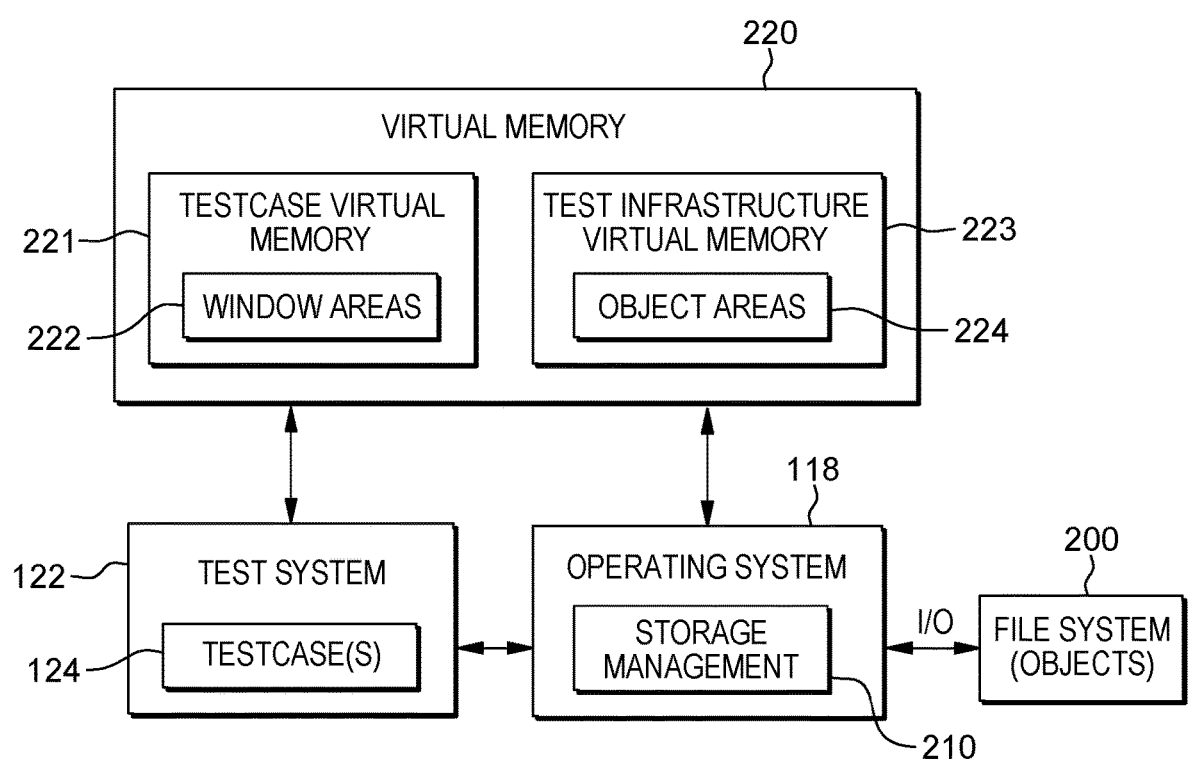
FIG. 2 depicts another example of a computing environment to incorporate and use one or more aspects of the present invention.

By way of example, FIG. 2 depicts a further embodiment of a computing environment to incorporate and use one or more aspects of the present invention. In one embodiment, the computing environment of FIG. 2 can be implemented as part of a computing environment such as depicted in FIG. 1.

In one or more implementations, the computing environment of FIG. 2 includes an operating system 118 and a test system 122 which can reside in memory of a computer system, such as memory 106 of computer system 102 of FIG. 1. As illustrated, test system 122 has associated therewith one or more testcases 124. In the embodiment depicted, the computing environment of FIG. 2 includes a storage device, such as a file system 200, which stores objects. In one embodiment, each object includes one or more memory pages or one or more regions of memory. A storage management subsystem 210 facilitates input/output of data between, for instance, operating system 118 and file system 200, in one example. In one or more implementations, storage management subsystem 210, as well as other file system management services, may be developed by an independent development team and not be available at the time of system test. Further, control over the duration of specific input/output requests or pages of data can be a useful testing feature. This is particularly true where the control does not result in delaying all inputs/outputs for the entire storage device that the object resides on, which could negatively impact other concurrent work using the storage device, or file system.

In accordance with one or more aspects of an embodiment disclosed herein, verification of storage management functions is achieved without actually requiring the input/output routines to perform input/output to the storage device, such as the file system 200. Further, control is provided over the timing of any simulated input/output, which allows for concurrent testing of one or more executing input/output processes by delaying completion of a simulated input/output operation. As illustrated in FIG. 2, virtual memory 220 is allocated for both a test infrastructure 223 and one or more testcases 221. In this manner, test infrastructure virtual memory 223 can contain object areas 224 of virtual memory, and testcase virtual memory 221 can contain window areas of virtual memory 222. In one embodiment, object areas 224 of test infrastructure virtual memory contain objects that would normally be managed by the user of a data access service, and typically reside on a type of external medium or storage device, such as a Direct Access Storage Device (DASD) implementing a file system such as file system 200. In accordance with one or more aspects of one embodiment of the present invention, the object is instead provided as an area 224 of virtual memory obtained and managed by the test infrastructure.

Further, a testcase 124 to be used in testing the system includes, in one or more aspects, a relationship between a window of memory and the object being processed by invoking, for instance, an associate service, which sets up a relationship between a memory buffer and the file or object. In this manner, an input/output operation of the testcase being processed by the test infrastructure is replaced with data movement between window area 222 and object area 224, and is thus, a memory-to-memory copy operation is to be performed by the test infrastructure. In one embodiment, each object area of object areas 224 has an associated or corresponding window area of window areas 222. In this manner, a range of virtual memory is obtained for each mapped object range, which serves as the "input/output device" for that object range. In one embodiment, a token can be generated which identifies the range assigned to a particular map. The input/output operations move the contents of the window pages into and out of these virtual memory storage ranges in response to requests from the testcase. In one embodiment, the testcase has no knowledge of where the window pages are being copied to, or even that there is no physical input/output being performed. The underlying virtual memory to virtual memory copying can be hidden from the testcase, in one embodiment. In implementation, there is a copy from the window area to the object area for an output routine, and for an input routine, there is a copy from the object area to the window area.

In one or more aspects of an embodiment, input and output routines are provided to schedule an independent unit of work to either copy from the window area to the object area for the output routine, or copy from the object area to the window area for the input routine. The independent routine can be controlled in a manner that either lengthens or reduces the duration of the simulated input/output, that is, that controls the transient input/output in progress state, discussed herein.

In one embodiment, each mapping has an associated control structure to represent it. In certain embodiments, one or more fields are introduced into the control structure to control, for instance, the duration of the input/output operation (e.g., the duration of the memory-to-memory copy) in, for instance, a page mode or a random mode. In page mode, an array of page addresses with corresponding delay times can be added to the corresponding control structure, referred to herein as a page map control structure, while in random mode, a lower and/or upper bound can be provided specifying that the time to delay is chosen at random. In one or more other implementations, a default delay can also be specified.

In one or more implementations, a testcase can be provided which allocates virtual memory for both the window area and the object area, and the testcase writes to, for instance, n pages of the window area. An autonomous unit of work is created, which delays for t seconds, and then accesses the first page of the window. In one implementation, the testcase can indicate in the control structure that input/output (I/O) for the first page is to be delayed by a time D, such as t+2 seconds (by way of example only) the first time input/output is required for the page. The testcase commits the changed window pages to the object. This gives control to the output I/O routine, which schedules an independent unit of work to perform the copy. The independent unit of work spins for delay time D, such as t+2 seconds (e.g., 5 seconds), and while its spinning, the unit of work wakes up from its t second (e.g., 3 seconds) wait. The unit of work takes a page fault on the first window page where the output I/O for the commit is in progress. When the I/O completes, the page fault is resolved. The testcase then verifies that the data copied is correct (i.e., the expected data).

In certain systems, especially systems that run on a hypervisor, the concept of a breakpoint is supported. A breakpoint interrupt provides another way for the testcase to find a routine to receive control when the instruction that the breakpoint is associated with is executed, assuming whatever other filters exist allow it. In such an environment, the above test scenario would change in that a breakpoint would be set up within the unit of work that the output I/O exit schedules to introduce a delay time D of t+2 seconds (for example) when the exploiting routine is the invoking testcase. The later filter needs to be processed by address space filtering on the breakpoint. For instance, when a breakpoint method is used for introducing a delay at a specific execution point, a decision can be made whether or not to delay the I/O based on environmental conditions. When the data structure is used for introducing a delay, the contents of fields of the data structure can be used to indicate the action to take, based on when the I/O has an error.

Figure 3A:
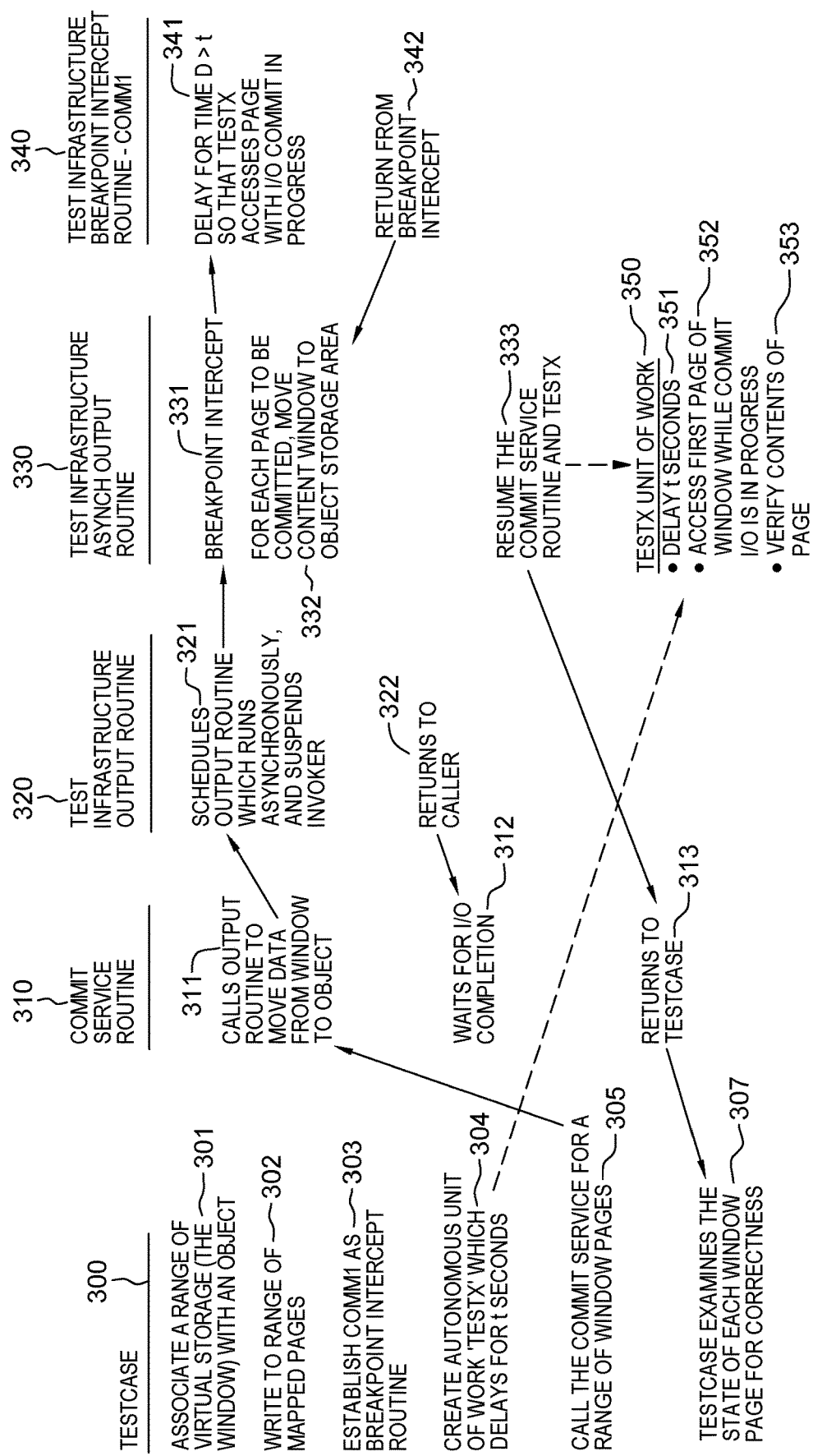
FIG. 3A depicts one embodiment of a workflow illustrating certain aspects of one or more embodiments of the present invention.

By way of example, FIG. 3A depicts one embodiment of a workflow for processing an input/output testcase by a test infrastructure, where the input/output testcase uses one or more breakpoints and there is a reference to a page with a commit output input/output in progress. In this case, the breakpoint trap determines the delay. As illustrated in FIG. 3A, the processing includes a testcase 300, a commit service routine 310, a test infrastructure output routine 320, a test infrastructure asynchronous output routine 330, and a test infrastructure breakpoint intercept routine, labeled COMM1 340.

Figure 3B:
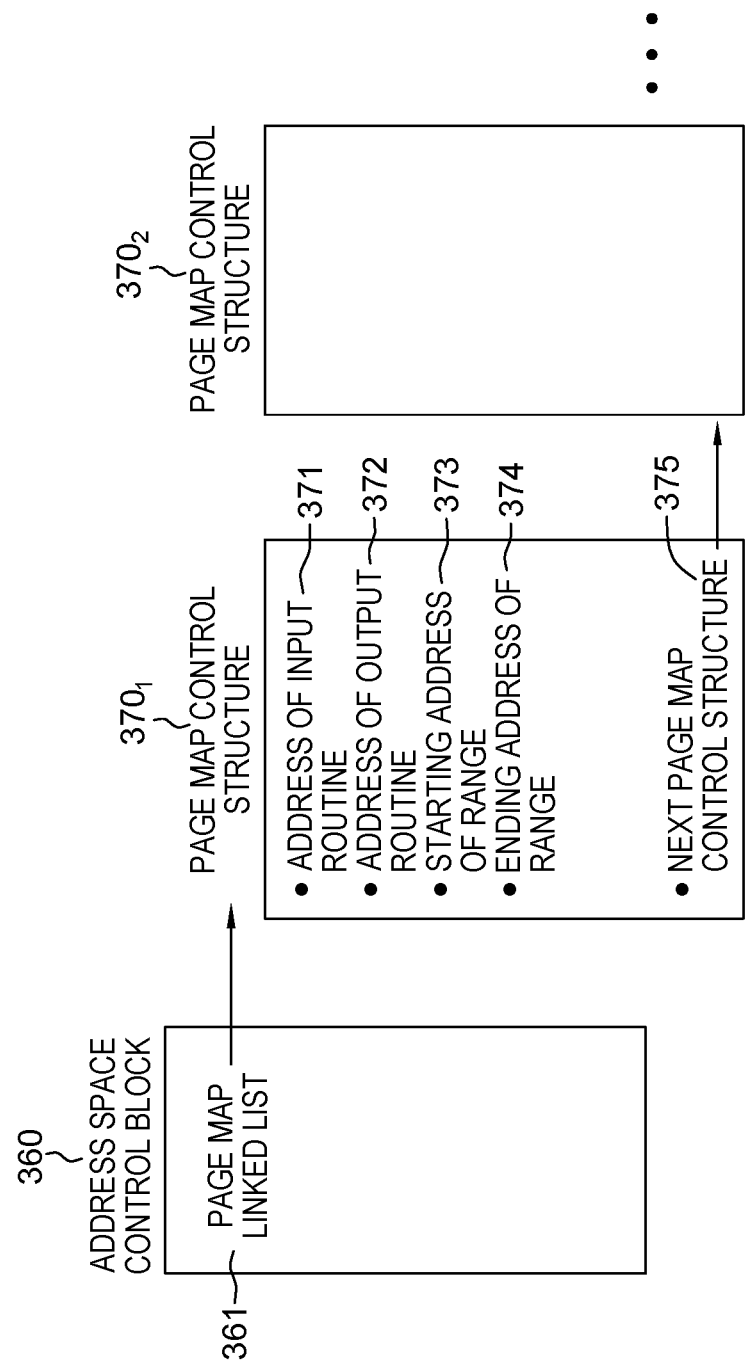
FIG. 3B depicts one embodiment of control structures associated with the workflow of FIG. 3A, in accordance with one or more aspects of the present invention.

In the embodiment of FIG. 3A, testcase processing 300 includes associating a range of virtual storage (i.e., the window) with an object 301, which creates a page map control structure. One embodiment of a page map control structure is depicted in FIG. 3B, where an address space control block 360 includes a page map linked list 361 which references one or more page map control structures $370_1$, $370_2$. As illustrated in FIG. 3B, each page map control structure $370_1$, $370_2$, can include an address of the input routine 371, an address of the output routine 372, a starting address of a storage range 373, and an ending address of the storage range 374, as well as a next page map control structure identifier 375, where applicable.

As illustrated in FIG. 3A, testcase processing 300 includes a write of data to the range of mapped pages 302. In the depicted embodiment, COMM1 is established as a breakpoint intercept routine 303, and an autonomous unit of work, referred to as TESTX, is created, which delays for t seconds 304. As illustrated, the TESTX unit of work 305 created by the testcase is delayed for t second 351, after which, TESTX attempts access to a first page of a window while a commit I/O is in progress 352, to verify content of the page 353, as described further below.

As depicted, testcase processing includes calling commit service 310 for a range of window pages 305 to write out the changed pages to the object. Commit service routine 310 initiates the output I/O by calling the output routine 320 to move data from the window to the object 311, and then waits for I/O completion 312 before returning to the testcase 313. As described herein, enhancements to the commit service can be tested and/or driven, even though formal exploitation of the enhancements are not yet available.

Test infrastructure output routine 320 schedules the output routine which runs asynchronously, suspends the invoker 321 and returns to caller 322. As illustrated in FIG. 3A, test infrastructure asynchronous output routine 330 initially experiences a breakpoint intercept 331, with the test infrastructure commit intercept routine COMM1 delaying for time D, which has a value greater than t, so that the separate TESTX unit of work, after being delayed t seconds 351, will access the page with I/O commit in progress 341. Upon completion of the breakpoint intercept, processing returns 342, and for each page to be committed, the content of the window is moved to the object area in storage 332, after which, the commit service routine and TESTX are resumed 333, with the commit service routine 310 returning to the testcase 313. The testcase examines the state of each window page for correctness 307, which completes the testcase 308.

Note further from the above description that the processing of FIG. 3A exposes a transient situation, referred to herein as the transient input/output in progress state, where TESTX attempts to access a page of storage with a commit I/O in progress. As noted, the TESTX unit of work 350 is initially delayed t seconds 351, before an access of the first page of the window is attempted 352. Further, the breakpoint intercept 331 delays for a time D value which is greater than t (e.g., D=t+2 seconds). Thus, the testcase unit of work is initially delayed a longer time interval than the TESTX unit of work, meaning that when the TESTX unit of work attempts access to the first page of the window at issue, the commit I/O is still in progress 352. When the TESTX unit of work 350 attempts to access the first page of the window while the commit I/O is in progress, the TESTX unit of work will take a page fault, and wait for completion of the output I/O operation. Once the breakpoint interrupt delay is completed, processing resumes the commit service 332, and implicitly, the TESTX unit of work is allows to resume as well. Once the TESTX unit of work gains control, it will also verify contents of the page 353.

Figure 3C:
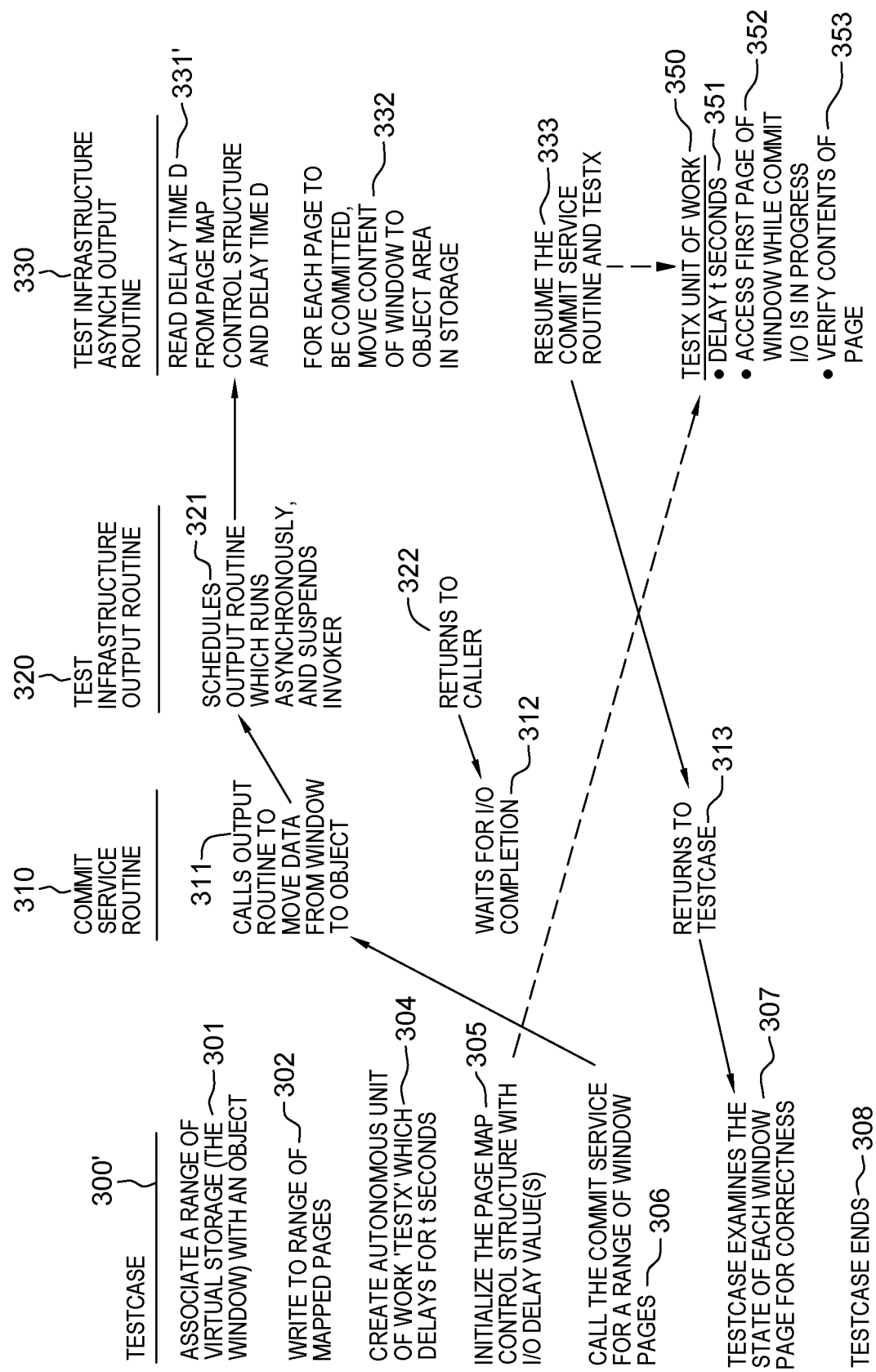
FIG. 3C depicts another embodiment of a workflow illustrating certain aspects of one or more embodiments of the present invention.
Figure 3D:
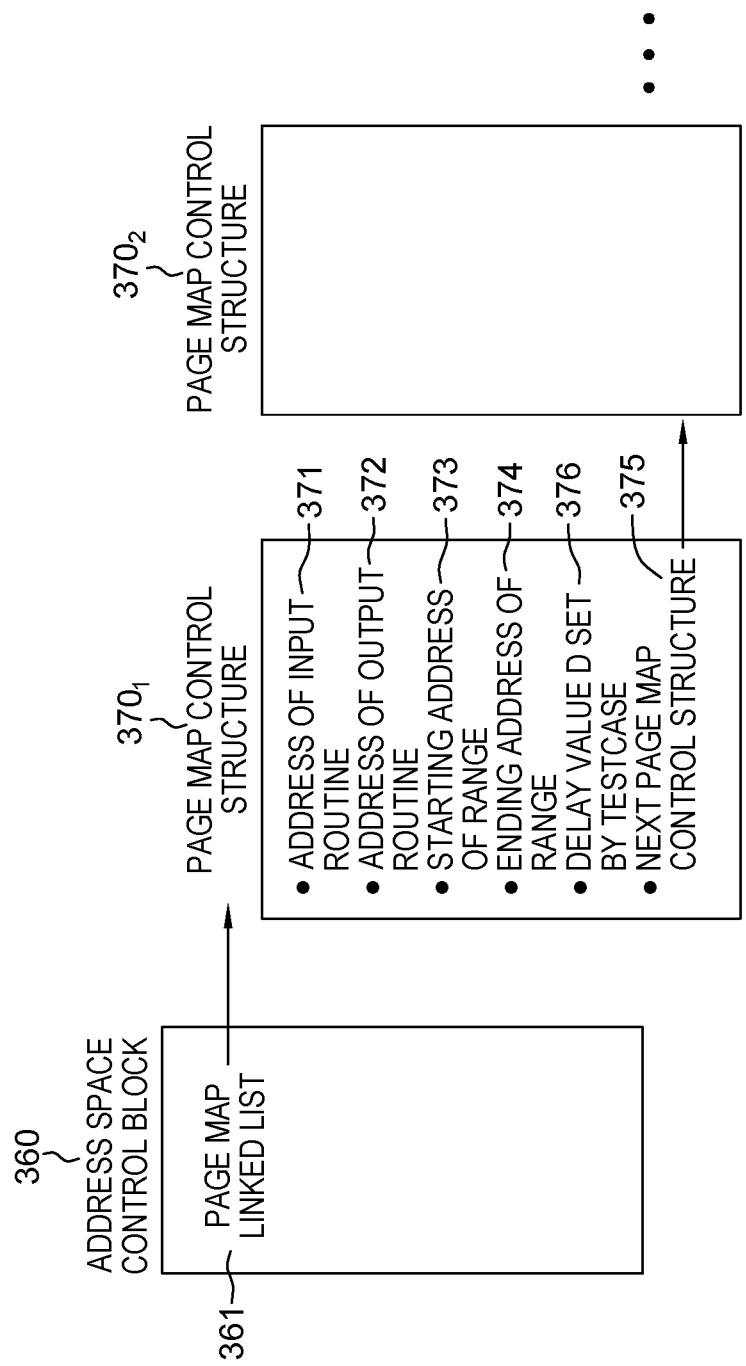
FIG. 3D depicts one embodiment of control structures associated with the workflow of FIG. 3C, in accordance with one or more aspects of the present invention.

FIG. 3C depicts another embodiment of a workflow illustrating output I/O testcase processing, in accordance with one or more aspects of the present invention. In this embodiment, the input/output delay time D is specified in the page map control structure, which is place of the breakpoint interrupt approach described above in connection with FIGS. 3A-3B. As illustrated in FIG. 3C, testcase processing 300' again includes associating a range of virtual storage (i.e., the window) with an object 301, which establishes the page map control structures $370_1$, $370_2$, as illustrated in FIG. 3D. As noted above in connection with FIG. 3B, an address control block 360 includes a page map linked list 361 which references the page map control structures $370_1$, $370_2$. In addition to the address of the input routine 371, the address of the output routine 372, the starting address of the storage range 373, the ending address of the storage range 374, and the next page map control structure identifier 375, the page map control structure $370_1$, $370_2$, is provided with a respective delay time D value set by the testcase.

As illustrated in FIG. 3C, testcase processing 300' includes a write of data to the range of mapped pages 302, and an autonomous unit of work, referred to as TESTX, is created, which delays for t seconds 304. As in the embodiment described above, the TESTX unit of work 304 created by the testcase is delayed for t seconds 351, and which TESTX attempts access to a first page of a window while a commit I/O is in progress 352, to verify content of the page 353, as described herein.

In addition, testcase processing 300' initializes the page map control structure with one or more input/output delay values D (including, for instance, for a page mode or random mode, at the discretion of the testcase) 305. In one implementation, in page mode, a single delay value can be added to the control structure (as depicted in FIG. 3D), and in another implementation, an array of page addresses with corresponding delay times (not shown) can be added to the control structure. In a further implementation, in random mode, a lower/upper bound can be provided in the control structure specifying the time to delay, which can be chosen at random. A default delay value can also be specified.

As illustrated, testcase 300' processing includes calling the commit service for a range of window pages 306 to write out the changed pages to the object. Commit service routine 310 is called, and as shown, the commit service routine calls the output routine to move data from the window to the object 311, and waits for I/O completion 312. As noted, in this manner, enhancements to the commit service can be tested and/or driven, even though formal exploitation of the enhancements is not yet available.

As illustrated, the test infrastructure output routine 320 schedules the output routine, which runs asynchronously, suspends the invoker 321, and returns to caller 322. The test infrastructure asynchronous output routine 330 reads the delay time D from the page map control structure, and delays by time D 331'. After delay time D, for each page to be committed, content is moved from the window to the object area in storage 332, which as discussed, is a memory-to-memory copy that simulates the I/O operation to/from the storage device, or file system. Upon completion of the memory-to-memory copy, the commit service routine and TESTX are resumed 333, with the commit service routine 310 returning to the testcase 313. The testcase examines the state of each window page for correctness 307, which ends the testcase 308. As noted, concurrent with the testcase unit of work to move content of the window to the object area in storage, the created TESTX unit of work 350 is processing.

As described with reference to FIG. 3A, the TESTX unit of work 350 can be a separate processing thread and be initially delayed by time t seconds 351. The delay t seconds is sufficient for the test infrastructure output routine to gain control and itself to be in delay time D, that is, for the testcase unit of work to be in the transient input/output in progress state. The TESTX unit of work 350 attempts to access the first page of the window while the commit I/O is in progress 352, which results in a page fault, meaning that the TESTX unit of work is waiting for the commit I/O to complete. In this manner, parallelism is created where one unit of work is accessing the page tables while there is a commit I/O in progress, and specifically in this case, where there is an output I/O in progress. As noted, the TESTX unit of work 350 verifies content of the page 353, as does the testcase 307, either of which can result in detecting an error in the system (as is also the case with the processing of FIG. 3A). Based on detection of an error, an action can be performed to facilitate correcting the system. For instance, in one or more embodiments, when an error or anomaly is detected, the testcase generates a message with a return code, which in one or more embodiments, includes a unique error code, or a unique reason code. This then allows the error or anomaly to be automatically corrected (in one embodiment) when possible.

In one or more implementations, a suite of testcases such as discussed herein can be provided which are regularly run. Note that, in addition to a testcase detecting an error, the system itself could detect the error. For instance, where the system is or includes an operating system, the operating system can detect the error during processing of the testcase, such as should something occur that the operating system is not equipped to handle.

Figure 4A:
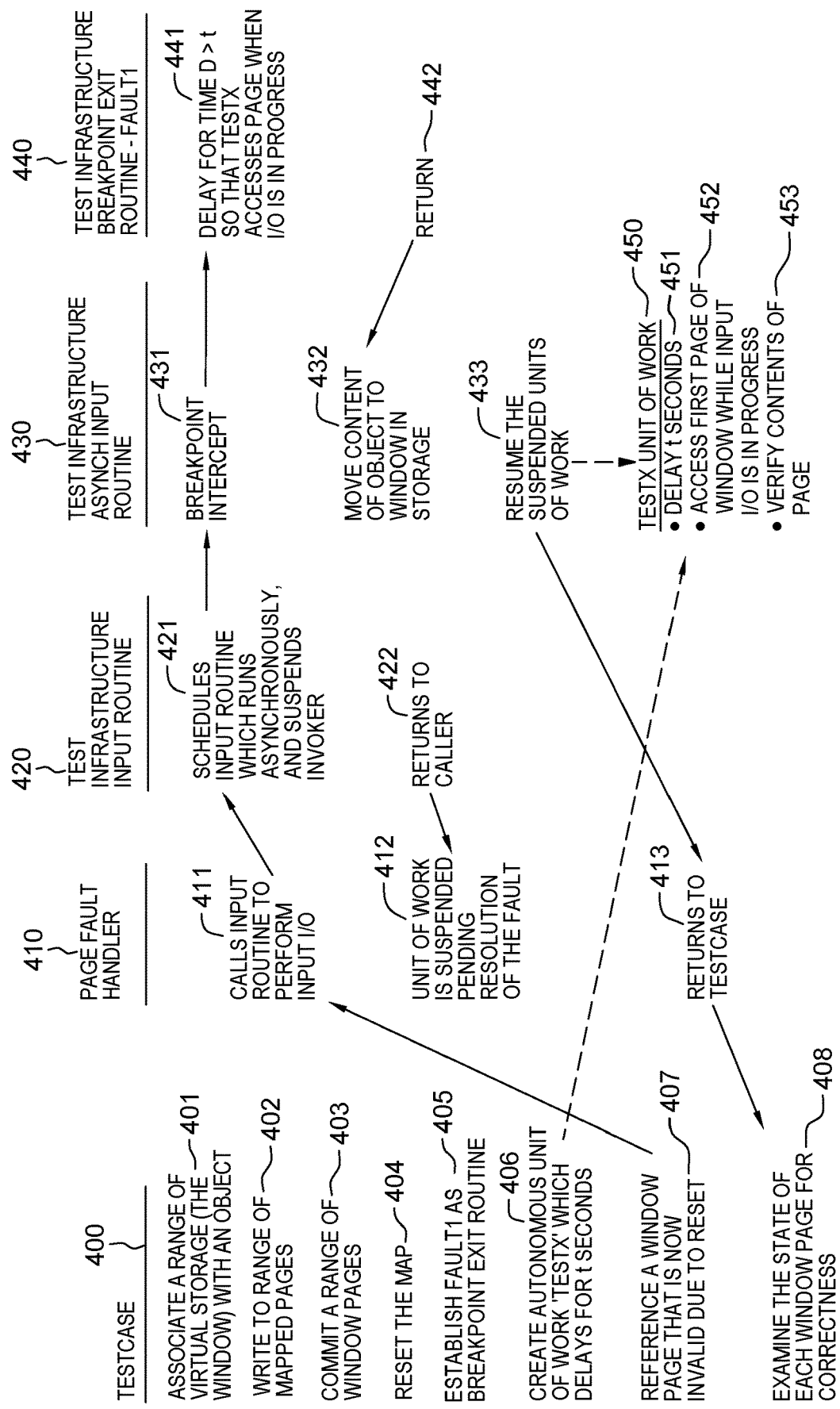
FIG. 4A depicts a further embodiment of a workflow illustrating certain aspects of one or more embodiments of the present invention.

By way of further example, FIG. 4A depicts a workflow embodiment which uses breakpoints to expose a transient input I/O in progress state which can be referred to from another unit of work, referred to herein as the TESTX unit of work. In the embodiment of FIG. 4A, the processing includes a testcase 400, a page fault handler 410, a test infrastructure input routine 420, a test infrastructure asynchronous input routine 430, and a test infrastructure breakpoint exit routine—FAULT1 440.

Testcase processing 400 includes associating a range of virtual storage (i.e., the window) with an object 401, which as noted above, creates the page map control structures such as described with reference to FIGS. 3B & 3D. The testcase includes writing to the range of mapped pages 402, and processing commits a range of window pages 403. The mapped page tables are reset 404, which means that the data only resides on the object. Therefore, any reference to the map, that is, the pages that are mapped, will result in a page fault, and the page fault will result in an input I/O occurring from the object. In particular, the data in the object would need to be read into the mapped pages.

As illustrated in FIG. 4A, FAULT1 is established as a breakpoint exit routine 405, and an autonomous unit of work TESTX is created, which delays for t seconds 406. In particular, as illustrated in FIG. 4A, the TESTX unit of work 450 includes an initial delay of t seconds 451, after which the unit of work attempts access to the first page of the window while the input I/O is in progress 452. This results in a page fault of the TEXTX unit of work 450 until content of the object area has been moved to the window in storage. Once resumed, the content of the page is verified 453.

As illustrated in FIG. 4A, testcase 400 unit of work processing includes referencing a window page that is now invalid due to the reset 407. This results in calling page fault handler 410, which calls the test infrastructure input routine to perform input I/O 411. The test infrastructure input routine 420 schedules the input routine which runs asynchronously, suspends the invoker 421, and returns to the page fault handler 422. The unit of work is suspended pending resolution of the fault 412.

Test infrastructure input routine 420 schedules the test infrastructure asynchronous input routine 430, which experiences a breakpoint intercept. The test infrastructure breakpoint exit routine-FAULT1 440 delays for time D established in breakpoint exit routine 441. As indicated, the delay time D value is greater then the delay t of the TESTX unit of work so that TESTX will access the page when I/O is in progress. After the delay completes, return 442 is made to the test infrastructure asynchronous input routine 430, which moves the object content to the window in storage 432. Once the input I/O is complete, the suspended units of work are resumed 433, which includes the testcase unit of work, as well as the TESTX unit of work. As illustrated in FIG. 4A, processing returns to the testcase 413, which then examines the state of each window page for correctness 408, and ends testcase processing, assuming no error is identified. As indicated above, any errors or issues with the page fault handling of the testcase can be detected, and an action performed, based on detecting the error or issue to facilitate correcting the system. In this manner, the page fault handler (including enhancements) can thus be tested and/or driven, even though the formal exploitation routines for the page fault handler are not yet available.

Figure 4B:
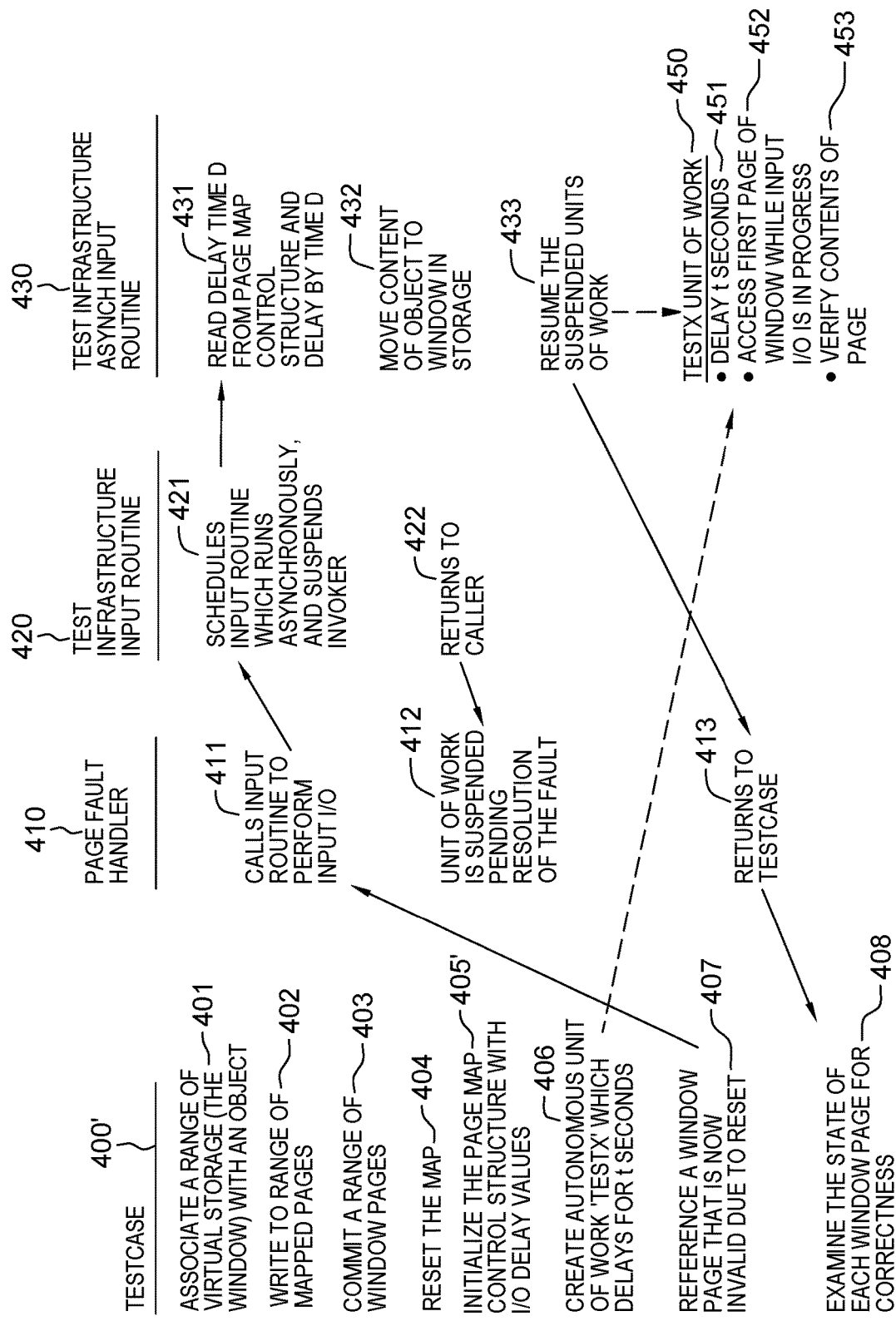
FIG. 4B depicts another embodiment of a workflow illustrating certain aspects of one or more embodiments of the present invention.

FIG. 4B is another example of input I/O in progress processing such as described above in connection with FIG. 4A, however, rather than using a breakpoint exit routine, the page map control structure is used to store a delay time D value. In this example, testcase 400' is similar to testcase 400 of FIG. 4A described above, including, for instance, associating a range of virtual storage (i.e., the window) with an object 401, writing the range of mapped pages 402, committing the range of window pages 403, and resetting the page map 404. In this embodiment, rather than establishing FAULT1 as the breakpoint exit routine, processing initializes the page map control structure with I/O delay time D values 405', an example of which is depicted in FIG. 3D, where page map control structures $370_1$, $370_2$ include delay value D set by the testcase. The autonomous unit of work TESTX is again created which delays for t seconds 406, as described above in connection with FIG. 4A.

Testcase 400' processing references a window page that is now invalid due to the reset 407, which results in an interrupt, with processing transitioning to page fault handler 410. Page fault handler 410 calls the test infrastructure input routine to perform input I/O 411. The test infrastructure input routine 420 schedules the input routine, which runs asynchronously, and suspends the invoker 421, that is, the page fault handler unit of work 410 is suspended. Processing returns to the caller 422, and the testcase unit of work is suspended pending resolution of the fault 412.

The test infrastructure asynchronous input routine 430 reads the delay time D from the page map control structure, and delays by time D 431'. After delay time D, the test infrastructure asynchronous input routine 430 moves the content of the object to the window in storage 432, and resumes the suspended units of work 433. As noted, resumption of the suspended units of work includes resuming the testcase unit of work, by returning to the testcase 413 to examine the state of each window page for correctness 408, and resuming the TESTX unit of work 450, by allowing access to the window pages, to verify content of the page(s) 453. As indicated above, any errors or issues with handling of the testcase can be detected, and an action performed, based on detecting the error or issue to facilitate correcting the system, which ends testcase processing 409. Advantageously, the page fault handler (including enhancements) can thus be tested and/or driven, even though the formal exploitation routines for the page fault handler are not yet available.

Advantageously, test infrastructure which enables the testing of enhancements to a data access service in the absence of an exploiting routine for the enhancements is provided herein. In particular, testcases are presented which simulate what the ultimate exploiting routine will eventually be performing. In one embodiment, data is moved from a testcase window in virtual memory to a test infrastructure object area in virtual memory to simulate the movement of data to an external file without the need to setup and execute the I/O operations to the storage device. Using this approach, the testcase can be provided with one or more delays to be introduced whenever data is written to or retrieved from the object. Thus, concurrent operations can be performed on the window page(s) while data movement is in progress, allowing error-prone paths to be more readily tested, thereby enhancing processing within the computing environment by early detection and resolution of any errors. As described, enhancements to a commit service can be tested and/or driven using this approach, even though the formal exploitation routines for the service are not yet available. Similarly, enhancements to a page fault handler can be tested and/or driven, even though formal exploitation of those enhancements are not yet available. Aspects of one or more embodiments described herein can be employed on any system platform that supports using a window of virtual memory to represent, for instance, a file system, where testing of the function is desirous, without performing actual I/O drivers to the storage device or file system. One or more aspects described herein assist in preventing the escape of errors in handling of unforeseen combination of events that can occur while input/output is in progress against an object. For example, aspects described herein can be used to cause a timing window to be extended, where data is being read from an object at the same time that the window page is being changed to a hidden state. Such a testcase can reveal that there might be an error in handling the testcase that incorrectly left the window page in an incorrect state. Various other examples will be apparent to those skilled in the art.

Further details of one embodiment of facilitating processing within a computing environment, as it relates to one or more aspects of the present invention, are described with reference to FIGS. 5A-5B.

Referring to FIG. 5A, in one embodiment, an input/output testcase is obtained for an object having one or more pages 500. The input/output test case is processed by a test infrastructure 502. Processing the input/output testcase includes, for a page of the object, generating a delay in the processing of the input/output testcase for a page of the object. The delay opens a transient input/output in progress state during which one or more concurrent test operations are to reference or impact the page of the object 504.

In one embodiment, the method further includes performing one or more concurrent test operations during processing of the input/output testcase, where a concurrent test operation of the one or more concurrent test operations is created by the input/output testcase 506. In one or more embodiments, the method further includes testing a system, the testing including the obtaining and the processing 508, and the method further includes detecting an error in the system resulting from performing the one or more concurrent test operations 510, and performing an action based on detecting the error to facilitate correcting the system 512.

In one or more implementations, the obtained input/output testcase specifies a breakpoint routine, and generating the delay is based on the breakpoint routine 514. Referring to FIG. 5B, in one or more other embodiments, the input/output testcase includes a page map control structure for the object, the page map control structure specifying a delay parameter, and generating the delay is based on the delay parameter of the page map control structure 516.

In one embodiment, the input/output testcase includes an input/output operation, and the test infrastructure performs the input/output operation as a virtual memory to virtual memory copy operation, with the delay opening the transient input/output in progress state during the virtual memory to virtual memory copy operation 518.

In one or more embodiments, the method further includes assigning the object to an object area of virtual memory managed by the test infrastructure 520. Further, in one embodiment, the input/output testcase further establishes a relationship between a window of testcase virtual memory and the object 522. In one embodiment, processing the input/output testcase by the test infrastructure includes performing a memory-to-memory copy by the test infrastructure in place of the input/output operation to an object storage device. The memory-to-memory copy is between the window of testcase virtual memory and the object area of the virtual memory managed by the test infrastructure 524.

In one embodiment, generating the delay includes remaining in the transient input/output in progress state until a predefined event has occurred 526.

In one or more embodiments, the input/output test case is an output test case, and the test infrastructure includes an output test infrastructure, and the generated delay is based on a breakpoint intercept routine specified by the input/output testcase or a delay specified in a page map control structure by the input/output testcase 528. In another embodiment, the input/output testcase is an input testcase, and the test infrastructure includes an input test infrastructure, and the generated delay is based on a breakpoint exit routine specified by the input/output testcase or a delay specified in a page map control structure by the input/output testcase 530.

Figure 6A:
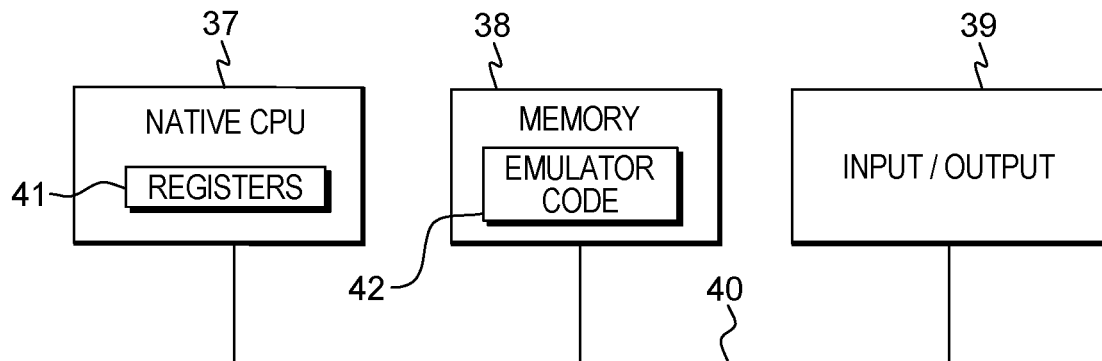
FIG. 6A depicts yet another example of a computing environment to incorporate and use one or more aspects of the present invention.

Another embodiment of a computing environment to incorporate and use one or more aspects of the present invention is described with reference to FIG. 6A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
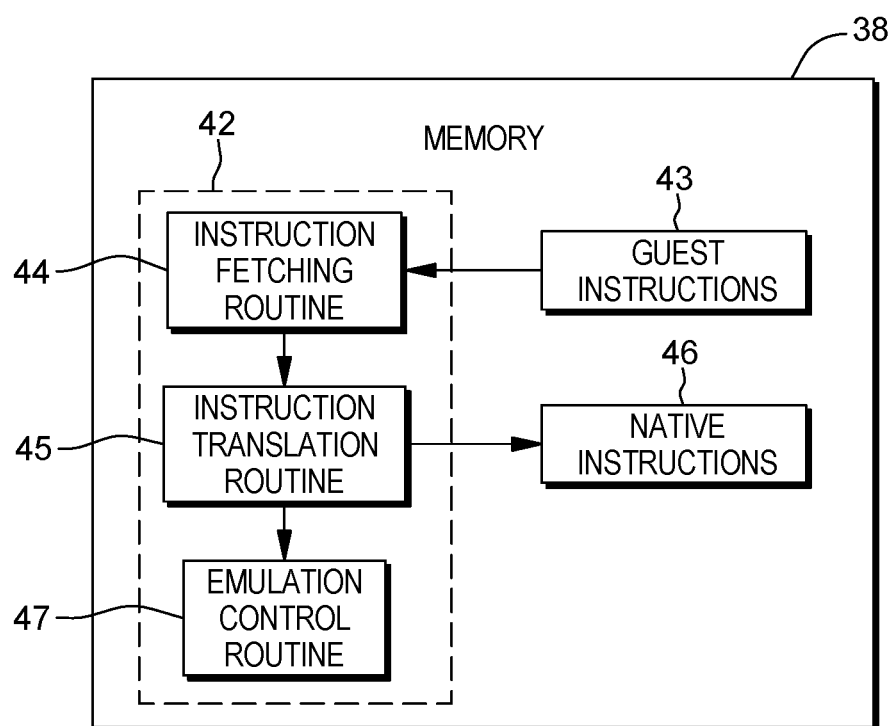
FIG. 6B depicts further details of the memory of FIG. 6A, in accordance with one or more aspects of the present invention.

Further details relating to emulator code 42 are described with reference to FIG. 6B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

One instruction that may be emulated is the Reset Dynamic Address Translation Protection instruction described herein, in accordance with an aspect of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
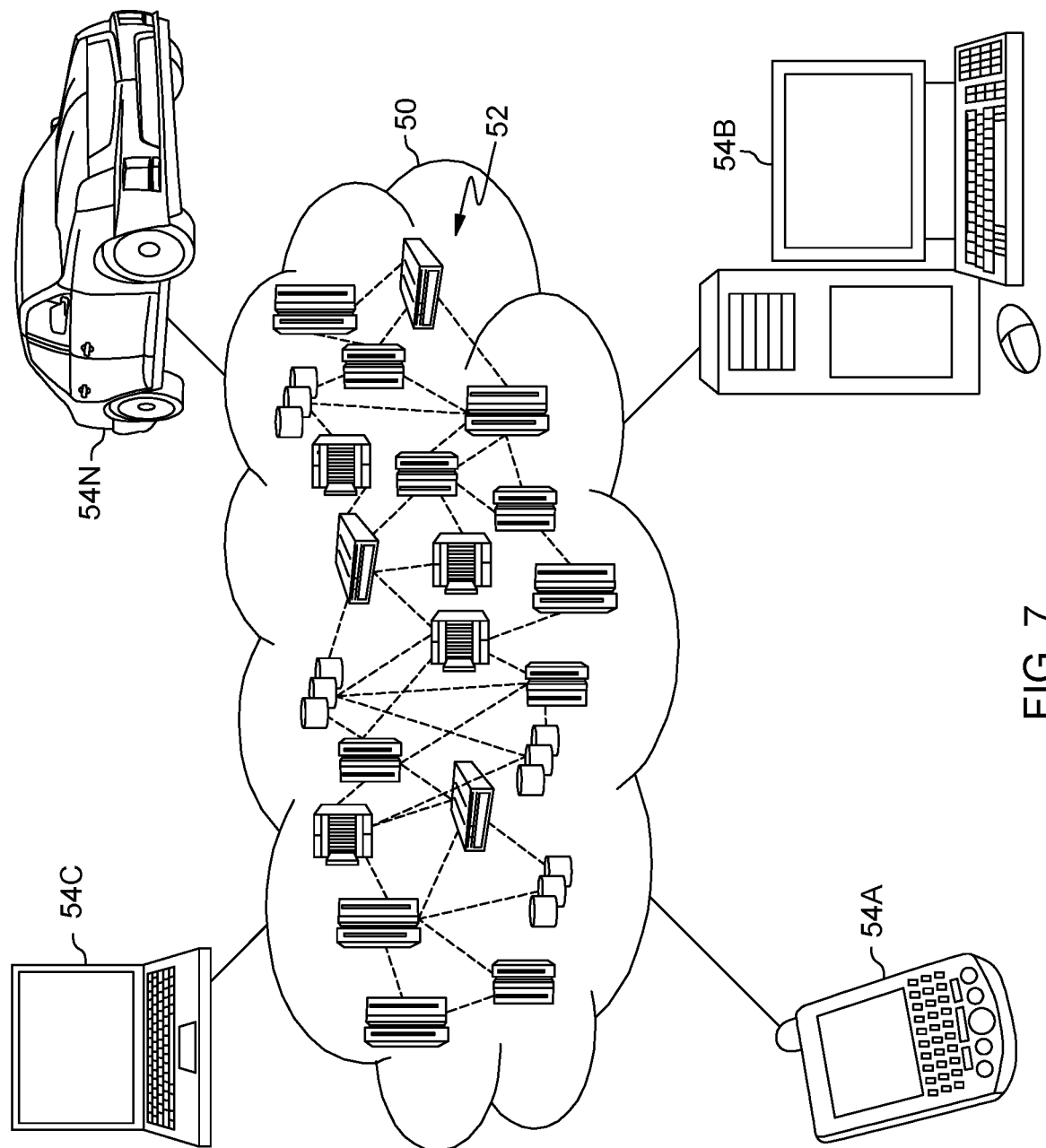
FIG. 7 depicts one embodiment of a cloud computing environment, in accordance with one or more aspects of the present invention.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 8:
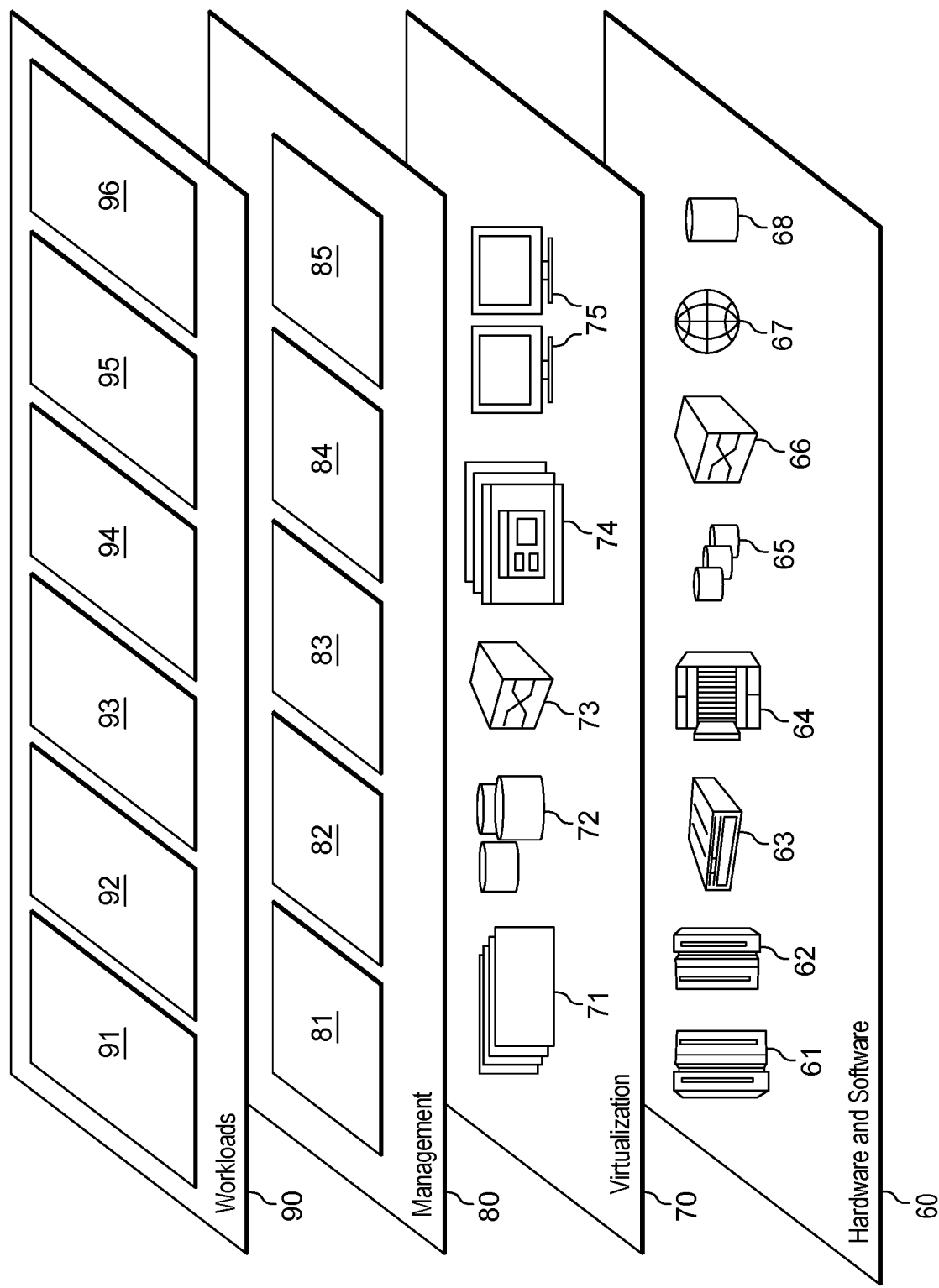
FIG. 8 depicts one example of abstraction model layers, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer-readable storage medium having program instructions embodied therewith, the program instructions being readable by a processing circuit to cause the processing circuit to perform a method comprising:
      obtaining an input/output testcase for an object having one or more pages; and
      processing the input/output testcase by a test infrastructure, the processing comprising, for a page of the object:
         generating a delay in the processing of the input/output testcase for the page of the object, the delay opening a transient input/output in progress state during which one or more concurrent test operations are to reference the page of the object.

2. The computer program product of claim 1, further comprising performing the one or more concurrent test operations during processing of the input/output testcase, wherein a concurrent test operation of the one or more concurrent test operations is created by the input/output testcase.

3. The computer program product of claim 2, further comprising testing a system, the testing including the obtaining and the processing, and wherein the method further comprises:
   detecting an error in the system resulting from performing the one or more concurrent test operations; and
   performing an action based on detecting the error to facilitate correcting the system.

4. The computer program product of claim 1, wherein the obtained input/output testcase specifies a breakpoint routine, and generating the delay is based on the breakpoint routine.

5. The computer program product of claim 1, wherein the input/output testcase includes a page map control structure for the object, the page map control structure specifying a delay parameter, and generating the delay is based on the delay parameter of the page map control structure.

6. The computer program product of claim 1, wherein the input/output testcase comprises an input/output operation, the test infrastructure performing the input/output operation as a virtual memory to virtual memory copy operation, the delay opening the transient input/output in progress state during the virtual memory to virtual memory copy operation.

7. The computer program product of claim 1, further comprising:
   assigning the object to an object area of virtual memory managed by the test infrastructure;
   wherein the input/output testcase further establishes a relationship between a window of testcase virtual memory and the object; and
   wherein processing the input/output testcase by the test infrastructure includes performing a memory-to-memory copy by the test infrastructure in place of an input/output operation to an object storage device, the memory-to-memory copy being between the window of testcase virtual memory and the object area of the virtual memory managed by the test infrastructure.

8. The computer program product of claim 1, wherein generating the delay comprises remaining in the transient input/output in progress state until a predefined event has occurred.

9. The computer program product of claim 1, wherein the input/output testcase is an output testcase, and the test infrastructure comprises an output test infrastructure, and wherein the generated delay is based on a breakpoint intercept routine specified by the input/output testcase or a delay specified in a page map control structure by the input/output testcase.

10. The computer program product of claim 1, wherein the input/output testcase is an input testcase, and the test infrastructure comprises an input test infrastructure, and wherein the generated delay is based on a breakpoint exit routine specified by the input/output testcase or a delay specified in a page map control structure by the input/output testcase.

11. A computer system for facilitating processing within a computing environment, the computer system comprising:
   a memory; and
   a processing circuit in communication with the memory, wherein the computer system is configured to perform a method, the method comprising:
      obtaining an input/output testcase for an object having one or more pages; and processing the input/output testcase by a test infrastructure, the processing comprising, for a page of the object:
    generating a delay in the processing of the input/output testcase for the page of the object, the delay opening a transient input/output in progress state during which one or more concurrent test operations are to reference the page of the object.

12. The computer system of claim 11, further comprising performing one or more concurrent test operations during processing of the input/output testcase, wherein a concurrent test operation of the one or more concurrent test operations is created by the input/output testcase.

13. The computer system of claim 11, wherein the obtained input/output testcase specifies a breakpoint routine, and generating the delay is based on the breakpoint routine.

14. The computer system of claim 11, wherein the input/output testcase includes a page map control structure for the object, the page map control structure specifying a delay parameter, and generating the delay is based on the delay parameter of the page map control structure.

15. The computer system of claim 11, wherein the input/output testcase comprises an input/output operation, the test infrastructure performing the input/output operation as a virtual memory to virtual memory copy operation, the delay opening the transient input/output in progress state during the virtual memory to virtual memory copy operation.

16. The computer system of claim 11, further comprising:
    assigning the object to an object area of virtual memory managed by the test infrastructure;
    wherein the input/output testcase further establishes a relationship between a window of testcase virtual memory and the object; and
    wherein processing the input/output testcase by the test infrastructure includes performing a memory-to-memory copy by the test infrastructure in place of an input/output operation to an object storage device, the memory-to-memory copy being between the window of testcase virtual memory and the object area of the virtual memory managed by the test infrastructure.

17. A computer-implemented method comprising:
    obtaining an input/output testcase for an object having one or more pages, the input/output testcase including a page map control structure for the object, the page map control structure specifying one or more delay parameters; and
    processing the input/output testcase by a test infrastructure, the processing comprising, for a page of the object:
        generating a delay in the processing of the input/output testcase for the page of the object, the delay opening a transient input/output in progress state during which one or more concurrent test operations are to reference the page of the object.

18. The computer-implemented method of claim 17, further comprising performing one or more concurrent test operations during processing of the input/output testcase.

19. The computer-implemented method of claim 17, wherein the obtained input/output testcase specifies a breakpoint routine, and generating the delay is based on the breakpoint routine.

20. The computer-implemented method of claim 17, wherein the input/output testcase includes a page map control structure for the object, the page map control structure specifying a delay parameter, and generating the delay is based on the delay parameter of the page map control structure.

* * * * *